(74.)
THOMAS BERRY.
Improvement in Harvesters.
No. 4,710.
Reissued Jan. 16, 1872.
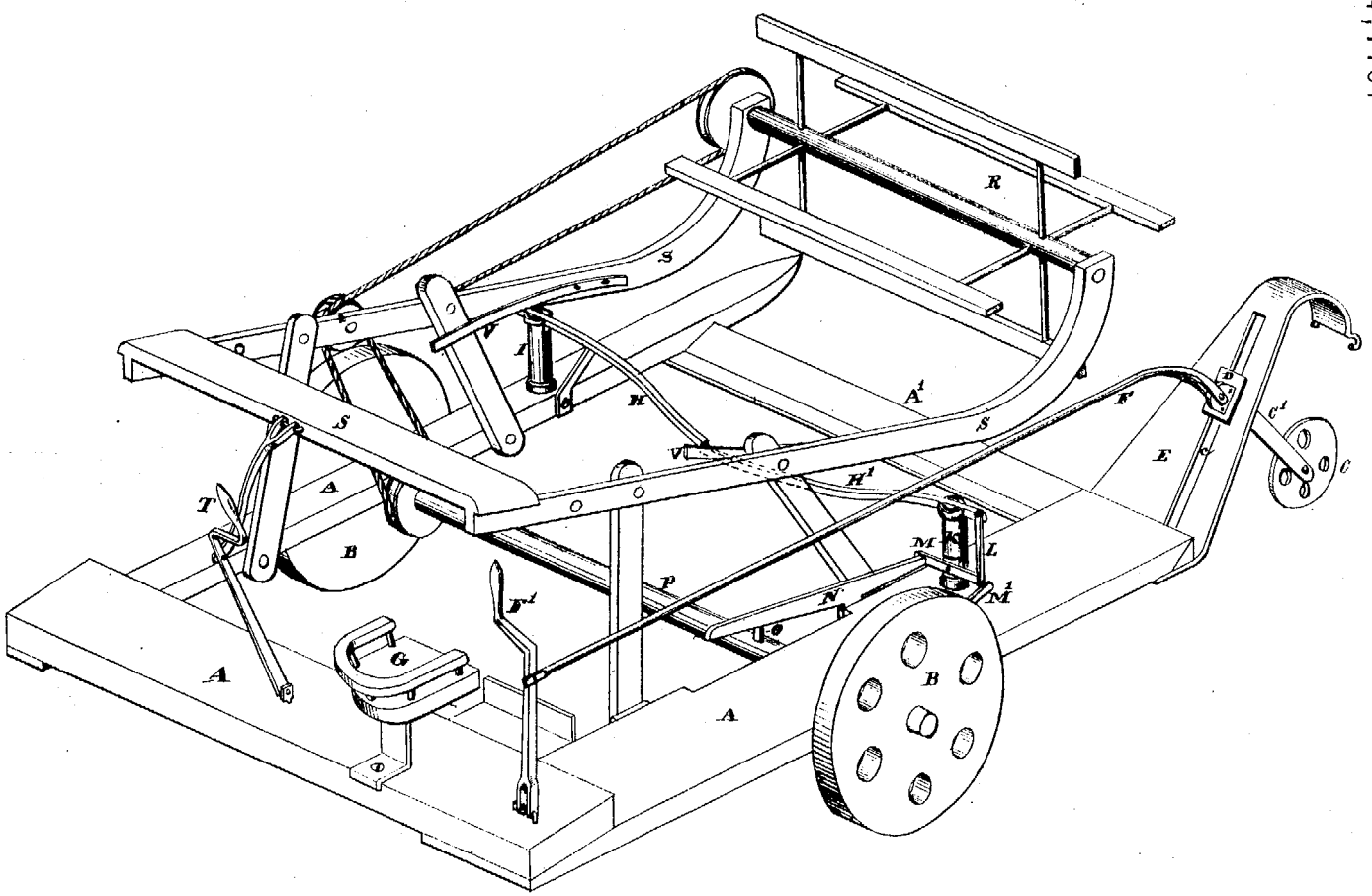
Witnesses
L. L. Marshall
Enoch Berry
Inventor
Thomas Berry
AM. PHOTO-LITHOGRAPHIC CO. N.Y. (OSBORNE'S PROCESS.)

BEST AVAILABLE COPY

UNITED STATES PATENT OFFICE.

THOMAS BERRY, OF LOUISBURG, KENTUCKY, ASSIGNOR TO JOHN F. SEIBERLING, OF AKRON, OHIO.

IMPROVEMENT IN HARVESTERS.

Specification forming part of Letters Patent No. 20,618, dated June 22, 1858; reissue No. 4,710, dated January 16, 1872.

DIVISION A.

*To all whom it may concern:*

Be it known that I, THOMAS BERRY, of Louisburg, in the county of Mason and State of Kentucky, have invented certain new and useful Improvements in Hemp-Harvesters; and I do hereby declare the following to be a a full, clear, and exact description of the same, reference being had to the accompanying drawing, which forms a part of this specification.

The drawing represents a perspective view of a harvesting-machine constructed with my improvements.

My invention which forms the subject-matter of this division of reissue, consists, first, in the combination and arrangement, in the manner hereinafter specified, of the adjustable front-supporting wheel, obliquely-set slotted guide-plate or shoe, and adjusting lever, whereby the cutter-bar can be very conveniently and quickly adjusted, as may be necessary; second, in the combination, with transverse bundling bars, one stationary and the other pivoted, so as to vibrate up and down, of mechanism for operating the same, in such a manner that the bundle or gavel when of the proper size will be automatically discharged, and the bundler automatically readjusted to receive another gavel as soon as the discharge is accomplished; third, in the combination with the bundling and discharging-rods and reel-supporting frame of spring-guides, as hereinafter described.

In the drawing, the part marked A represents the frame of the machine, A′ indicating the position of the cutter-bars. This frame is mounted upon two propelling-wheels, B B, and a small supporting-wheel, C, which is disposed as shown. The standard C′ of the wheel C is attached to a flanged sliding block, D, which is fitted to slide freely in a longitudinal slot, formed in an inclined shoe or guide-plate, E, said plate projecting upward and outward longitudinally from one of the front corners of the frame A, in a line quite oblique to a horizontal plane. F indicates a curved forked rod, connecting the sliding block D with an adjusting-lever, F′, which is situated at a convenient position near the driver's seat G. With this arrangement, it will be evident that the driver can by moving forward the adjusting-lever F′, cause the sliding block D to ascend the inclined plane of the guide E in the slot *c*, and thereby move the wheel C some distance forward of the cutter-bar, thus allowing the cutter-bar or front end of the frame on which it is arranged to descend nearer the surface of the ground, and by moving the lever F′ in an opposite direction, the front end of the frame will be raised by reason of the wheel C being brought nearer to or directly under the same, or to a lower position on the inclined guide-plate E. The draft attachment for drawing forward the machine may be attached to the forward end of the plate or shoe E. H H′ indicates the bundler and discharger. It is arranged across the frame A at the proper distance in the rear of the cutter-bar to receive the stalks as they fall. The rod H of the bundler is attached fast, and made immovable up or down on a standard, I, at one side of the main frame, while the rod H′ is pivoted to a similar standard, K, on the opposite side of said frame. The outer end of the pivoted rod H′ is connected by means of a link, L, to a vertically-vibrating arm, M, pivoted to and having its fulcrum upon the standard K, while a spring, M′, is combined with the arm M, in such a manner that the rod H′ will be sustained in an elevated position by the force of said spring. N indicates a lever pivoted to the frame A at or near its center, as indicated, and connected with the inner end of the spring-rocking or vibrating-arm M. O indicates a cam or projection on the propelling-axle P, for elevating or actuating the loose end of the lever N at proper intervals. It will be evident, with this arrangement of the parts, that when the bundler H H′ becomes charged with a load, or rather at each revolution of the axle P, the projection O on said axle P will elevate the end of the lever N, thereby depressing the inner end of the rocking-arm M, so as to elevate the outer end of the same, and thus through the connecting-link L raise the outer end of the bundler-rod H′, and consequently depress its inner end and effect the discharge of the bundle or gavel upon the ground. As soon as this is accomplished, said rod H′ will be readjusted to its original position, by the force of the spring M′ acting upon the arm M. A suitable reel, R, for bringing the stalks into proper posi-

BEST AVAILABLE COPY tion to be cut, and afterwards delivering them upon the bundler-rods H H′, is arranged above the cutter-bar, and operated by suitable driving connections from the propelling-wheels. Said reel may be constructed and arranged as shown in the drawing, or in some other form and manner, as desired. In this instance the reel R is hung at the forward end of an adjustable frame, S, which is supported by swinging standards pivoted to the main frame A, in such a manner that the frame S can be moved back and forth by means of a hand-lever, T, for the purpose of elevating and depressing the reel to suit the different heights of stalks and crops. But as this part of my invention relating to the adjustable reel and its operating devices, forms the subject-matter of a separate division of reissue, bearing even date herewith, no further description will be necessary herein. Upon the inside of the frame S are arranged inclined spring-guides *v* to direct the falling stalks toward the central portion of the bundling device, and to prevent said stalks from lodging on the sides of the frame.

It will be understood that the cutter-bar cutting devices may be constructed of any well-known and suitable forms, and arranged to be operated from the propelling-wheels by some one of the old and common modes.

Having described my improvements in hemp-harvesters, what I claim as my invention, and desire to have secured by Letters Patent, is—

1. The combination, with the obliquely-arranged slotted guide-plate or shoe E, and flanged sliding block D, of the supporting-wheel C, and the adjusting devices F F′, substantially as described.

2. The combination, with the transverse bundling-bars H H′ and the propelling-axle P, of the levers M N, link L, spring M′, and cam or pin O, or equivalents of these devices, substantially as and for the purposes set forth.

3. The combination, with the bundling and discharging-rods H H′ and reel-supporting frame S, of the spring-guides V V, substantially as described.

THOMAS BERRY.

Witnesses:
S. L. MARSHALL,
ENOCH BERRY.

(74)